United States Patent [19]

Vernois et al.

[11] Patent Number: 4,513,056
[45] Date of Patent: Apr. 23, 1985

[54] CELLULOSIC MATERIALS RENDERED TRANSPARENT

[75] Inventors: Michel Vernois, Courbevoie; Jean-Paul Duboeuf, Charavines, both of France

[73] Assignee: Arjomari-Prioux, Paris, France

[21] Appl. No.: 478,050

[22] Filed: Mar. 23, 1983

[30] Foreign Application Priority Data

Mar. 25, 1982 [FR] France ................................ 82 05124

[51] Int. Cl.³ ........................ B32B 23/10; B32B 27/08
[52] U.S. Cl. .................................... 428/264; 428/342; 428/482; 428/497; 428/503; 428/508; 428/511; 428/918; 427/379; 524/297; 162/168.1
[58] Field of Search ............... 428/503, 508, 511, 918, 428/264, 482, 342, 497; 162/168.1

[56] References Cited

U.S. PATENT DOCUMENTS 3,589,974  6/1971  Albrinck et al. ............... 428/918 X
3,684,551  8/1972  Seiner .................................. 427/152

FOREIGN PATENT DOCUMENTS 41309  4/1979  Japan ................................... 428/918

*Primary Examiner*—Patricia C. Ives
*Attorney, Agent, or Firm*—Bacon & Thomas

[57] ABSTRACT

The invention relates to cellulosic supports rendered wholly or partly transparent by a process of impregnation. One of the characteristics of the impregnation compositions proposed is its aptitude to migrate very rapidly to the heart of the cellulosic supports. The invention is applicable to drawing, reproduction, windows for envelopes, lampshades, creation of watermarks by a photogravure process.

13 Claims, 2 Drawing Figures

CELLULOSIC MATERIALS RENDERED TRANSPARENT

The present invention relates to a process for obtaining a novel paper rendered wholly or partly transparent by impregnation in a special bath (hereinafter referred to more briefly as "transparentized" and "transparentization"), for applications such as drawing, production of graphs on tracing boards, graphic lay-outs, reproduction, manufacture of transparent windows for envelopes, as well as paper for lamp-shades, and even a watermarked paper.

The process employed in tracing paper, which consists to produce transparentizing by thorough refining of the pulp to a Shopper Riegler degree higher than 90°–95° SR, has been known for a long time. This technique which consumes much energy and is therefore expensive leads, furthermore, to a paper whose dimensional stability with respect to hygrometric variations is poor, these variations being very different depending on the machine direction and the cross direction. This results in modifications which are detrimental to the plans and graphs made on this type of support.

Papers which have been transparentized by incorporation of a chemical substance or a mixture of substances are also known.

In order to give the required optical properties, the constituents of the mixture must have a refractive index close to that of cellulose, viz 1.5. The spaces between the fibres of the support are thus filled by the impregnation bath, this resulting in a uniform transparency.

The desired characteristics of a transparentized paper are surface hardness, excellent receptivity of inks, good resistance to handling, excellent mechanical strength, low opacity, perfect transparency to UV radiation, as well as stability in time of all these properties with time.

The prior art includes a number of patents for transparentizing a cellulosic substance, but the majority of the solutions recommended either do not enable all the desired characteristics to be obtained simultaneously, or are difficult to apply on an industrial scale as they require that the paper remains wet for a long period of time for the transparentization agent to penetrate to the heart of the paper.

The following methods of transparentizing paper have been proposed:

(a) The addition to a relatively opaque paper of fatty substances (U.S. Pat. No. 1,731,679), of siccative oils (German Pat. No. 1 546 460), of plasticizers, in the form of impregnation solution.

Although the transparency obtained is generally good, the transparentization agent tends to migrate to the surface of the paper, this resulting, in addition to problems of spotting, in difficulties in writing, a greasy touch and a yellowing in time.

(b) Impregnation by natural or synthetic polymers and cross-linking thereof.

By way of example, the following processes have been suggested:

impregnation by terpene polymers (German Patent No. 1 546 461), by polyurethanes (U.S. Pat. Nos. 1,036,572 and 4,137,046), by a methacrylic resin (Soviet Union Pat. No. 534 540), by bi- or multi-component systems (epoxy resin+polyaminoamide (German Pat. No. 1 282 437), by a melamine-formaldehyde resin.

These compounds are often applied in combination with a phthalate type plasticizer.

In most case, they require the use of a catalyst in order to eliminate the sticky character of these resins in the absence of cross-linking reaction (the catalytic systems have proved to be difficult to control. A product well cross-linked on the surface but poorly cross-linked in the heart of the paper is generally obtained. A brilliant surface is thus obtained—while mattness is sought after—and on which the ink forms beads.)

These polymer resins are substances of relatively high viscosity, and therefore they cannot penetrate rapidly in the pores of the paper to give a perfectly homogeneous transparency. It is therefore necessary industrially, after a first machine impregnation, to wind the paper in the wet state so that the resin can migrate to the heart of the support.

This operation may last several days and even several weeks before proceeding with final cross-linking by heat, UV radiation or electron beam bombardment (such a rest in the wet state on a reel may last abut fifteen days, a second passage must then be made on machine, and, despite this, the paper presents flaws, such as in particular shiny patches. This represents serious drawbacks to which the final cross-linking step must be added).

(c) Incorporation in the support of synthetic fibres in the form of pulp, the transparency being obtained by calendering hot or embossing on a roller which will determine the desired surface state. This process necessitates expensive equipment which is not wide-spread in the papermaking sector. Moreover, the graphic aptitude of the supports obtained after hot-calendering is generally not very good, the ink tending to form beads.

The present invention relates to a process for impregnating a cellulosic support in sheet or web form by a composition (or "sauce") comprising the combination of an aminoplast resin or a modified alkyd resin, and of a ketone-aldehyde condensation resin, a plasticizer and a solvent.

The aminoplast resin is selected from the group of melamines and preferably the methoxymethylmelamines.

The ketone-aldehyde condensation resin is more particularly selected from the modified ketone-aldehyde resins.

The plasticizer forms part of the family of phthalates, adipates, sebacates, tall oil, oils such as castor, linseed, soy bean, palm, groundnut oil, fatty acids, epoxide oils, polymer plasticizers.

The solvent will be selected from the solvents having, simultaneously, a boiling point higher than 150° C. and a refractive index of between 1.4 and 1.6.

It may preferably be from petroleum cuts of paraffin of isoparaffin character, dearomatized, or of aromatic solvents.

Among the solvents, it appears more judicious, for reasons of hygiene and safety, it is preferred to use paraffin or isoparaffin compounds comprising more than 7 atoms of carbon.

The modified ketone-aldehyde resin gives the support a strong transparentization.

In the absence of catalyst, the resin alone retains a sticky touch. In order to give the finished product a suitable surface hardness and a certain rigidity, it is necessary to cross-link the resin, forming a three-dimensional system.

To this end, a melamine resin may be mixed with the ketone-aldehyde resin. The choice of this aminoplast resin is a hexamethoxymethylmelamine in its monomer form for reasons of reactivity and low viscosity. This low viscosity will allow the whole of the impregnation composition to migrate rapidly to the heart of the cellulosic support.

Even if the transparentization composition is applied on only one of the faces of the support, by an appropriate coating device, thorough migration is very rapid (a few seconds). Of course, this speed of migration is a function of the nature of the cellulosic support, but the transparentization composition according to the invention is so mobile (viscosity of between about 30 and 70 cPo) that in fact this speed varies very little depending on the nature of the support. It will be noted that the application on one face only promotes degassing of the sheet, which is an appreciable advantage.

By way of example, for a 100% rag support, the thorough migration time is from 1 to 2 seconds and the composition reaches the other face in 2-3 seconds; about 5 seconds appears to be a maximum time.

Although the application on one face only is perfectly satisfactory, it is possible to apply the impregnation composition simultaneously on the two faces, either by coating or by passage of the support through a bath of the impregnating composition.

INFLUENCE OF THE FILLERS

The fillers do not appear to hinder transparentization insofar as they present a refractive index of the order of magnitude of that of cellulose, and of the resin, viz. about 1.5.

This therefore includes the conventional fillers used in papermaking, such as kaolin, talc, chalk . . . , but excludes the fillers of the $TiO_2$ type for example, whose refractive index of about 2.5 is much higher than that of the cellulose and resin.

The amount of fillers is limited only by the fact of the lowering of the mechanical characteristics of the support used.

According to the invention, the functions of the two resins are well defined.

Thus, the ketone-aldehyde resin has as its function (virtually 100%) the transparentization of the support. This has been established by a test whereby the ketone-aldehyde resin was retained, but the cross-linking system was changed (a known system comprising a catalyst was used instead of the melamine/heat system used according to the invention): very substantially the same transparentization was obtained, which implies that the resin of melamine type has virtually no function of transparentization in the present case.

U.S. Pat. No. 3,813,261 mentions the use of methoxymethylmelamine as transparentization agent but in combination with polyol ethers and an acid catalyst. This is therefore a different process since, according to the present invention, as has just been stated, the melamine essentially acts as coupling agent and the reaction requires no catalyst, cross-linking occurring exclusively by thermal reaction.

The bridging reaction with heat-setting compounds inevitably leads to the formation of a three-dimensional system which gives the final product a certain brittle character. It goes without saying that, although the surface hardness is a parameter sought after for a transparentized support for graphic use, these papers are intended to be handled without particular precautions and a brittle nature would be highly detrimental to intensive use. It is therefore necessary to provide softening by addition of a plasticizer such as, by way of non-limiting example, a phthalate. The choice of the plasticizer will be directed to a compound which will not tend to migrate to the surface in time or under the action of heat. Dibutylphthalate will preferably be used.

The use of the solvent medium was preferred to the aqueous system since, in the latter case, during impregnation, the cellulosic fibres tend to increase in volume rapidly by hydration. The transparentization resin therefore occupies only part of the volume between fibres and, during drying, the evaporation of the water leads to a substantial loss of transparentization, the fibres no longer being perfectly coated with the resin. In order to obtain a product of good optical transparency and of homogeneous fading, it is preferable to use a solvent whose refractive index is between 1.4 and 1.6 and whose boiling point is higher than 150° C. to remain included in the paper after cross-linking reaction.

Petroleum cuts of the ISOPAR G, H, L, M type (isoparaffin products) will preferably be used, which, moreover, do not contain any aromatic solvent.

However, as a general rule, a solvent system will be used which comprises, in addition to the above-mentioned petroleum cuts, one or more alcohols such as ethyl, isopropyl, butyl or isobutyl alcohols, the latter giving the characteristic of absorptivity, and further lowering the viscosity, whilst serving as solvent for the ketone-aldehyde resin.

According to a less preferred embodiment, only one or more of these alcohols may possibly be used as solvent.

Finally, it is possible to use aromatic solvents, but the known problems of toxicity are encountered when such solvents are used.

It will be noted that, in the prior art processes, the solvent employed is used temporarily, i.e. it is intended to be eliminated.

On the contrary, according to the invention, the solvent remains in the final product and participates in the definitive structure thereof, at least in part. Among other advantages, the (expensive) recovery of the solvent is thus avoided.

The transparentization method forming the subject matter of the invention is applied to a wide range of cellulosic supports such as papers based on rags, linters, chemical pulps, mechanical pulps, nonwoven compounds, in the form of sheets or webs, continuous or not.

In fact, the novel method is applied to any cellulosic support from pure rags up to 100% wood (mechanical pulp) passing through all the intermediate combinations and in particular chemical cellulose. The transparentization of a fabric may even be envisaged.

The choice of the support will depend for example on its cost, the necessity of complying with certain national standards, and the like.

The weight per square meter of the basic paper used may be between 20 and 350 grams. It may be a support sized en masse or not sized, with or without surface sizing, insofar as these treatments do not modify the speed of penetration in the support of the transparentization composition in solvent medium nor the absorptivity of the fibres and the total setting in an impregnation bath.

For reasons of mechanical strength and permanency in time of the physical characteristics, a support based on linters (pure rags) will be preferred, the pulp being previously refined to obtain a Shopper Riegler degree of between 40° and 65° SR.

The preferred transparentization composition is constituted as follows, the percentages being expressed by weight:

| | |
|---|---|
| Condensation resin (ketone-aldehyde) | 10 to 20% |
| Resin participating in cross-linking (hexamethoxymethylmelamine or modified alkyde resin) | 15 to 30% |
| Isopropyl, and/or butyl and/or isobutyl alcohol | 7 to 15% |
| Plasticizer | 25 to 35% |
| Solvent of the petroleum cut type with boiling point > 150° C. and refractive index of between 1.4 and 1.6 | 10 to 20% |

The following example illustrates the invention without, however, limiting the scope thereof.

EXAMPLE (CP$_2$702)

The transparentization formulation detailed hereinbelow has been prepared, the percentages of the different constituents being expressed by weight.

| | |
|---|---|
| Modified ketone-aldehyde condensation resin (*) (acid index ≃ 0.2 mg KOH/g (DIN 53402) OH index: 300–320 mg KOH/g | 12% |
| Hexamethoxymethylmelamine resin (produced by ROSSOW under the name Dynomin MM 103) | 23% |
| Ethyl alcohol | 4% |
| Butyl or isopropyl alcohol | 17% |
| Dibutylphthalate (marketed by BASF under the name of Palatinol C) | 28% |
| Petroleum cut of isoparaffin products Isopar G (ESSO Standard) | 16% |

(*) condensation acetophenone + formaldehyde, the whole being hydrogenated.

The base support with a grammage of 49 g/m$^2$ was obtained from a 100% linters pulp refined to obtain a Shopper-Riegler degree of between 50 and 60. The physical characteristics of this support are brought together in Table I hereinbelow.

The transparentization composition of which the formula is given in detail hereinabove, was applied to one sole face of the support by a process of impregnation by an applicator roller.

The solution penetrates uniformly and in less than 5 seconds to the heart of the paper and the possible excess of composition is removed by passage of the sheet in a press of which the pressure between the rollers can be varied. The transparentized paper is then dried by passage of the sheet in a hot air drier with air-borne sheet, of which the first zone of heating is taken to a temperature of 110°–120° C. and the second zone to a temperature of between 135° and 150° C.

In the first zone, a partial cross-linking is produced such that it does not prevent migration (it is known that the least possible transparentization compositon must remain on the surface).

In the second zone, total cross-linking is produced.

This represents the best modus operandi, but a drier incorporating one zone, or other equivalent variants, may be envisaged.

The quantity of transparentization composition absorbed by the paper was 7 g/m$^2$.

In this way, a transparentized paper is obtained on leaving the drier, whose opacity is 40.5 while the basic paper present an opacity of 65. Moreover, this tranparentized paper is very stable dimensionally with respect to the variations in relative humidity, is transparent to ultra violet radiation and is therefore suitable for duplication by the diazo process, has an excellent graphic aptitude both concerning the quality of writing and drawing and of erasing. It may moreover be used in photocopying apparatus of the xerographic type, whether the developers employ powder toner or liquid toner.

Furthermore, it possesses a better fading (less granitic appearance) than papers of the state of the art.

Comparative tests have been made between the transparentized paper obtained according to the above example, a tracing paper and two known transparentized papers.

The properties of the four products are shown in Table II hereinafter.

The mechanical characteristics obviously depend on the support used. The transparentized paper obtained stands out, particularly in the present case, from the tracing paper by its high resistance to tear and by its better dimensional stability, particularly in cross direction.

APTITUDE TO OBTAIN WATERMARKS BY PHOTOGRAVURE OR OFFSET

Figure 1:
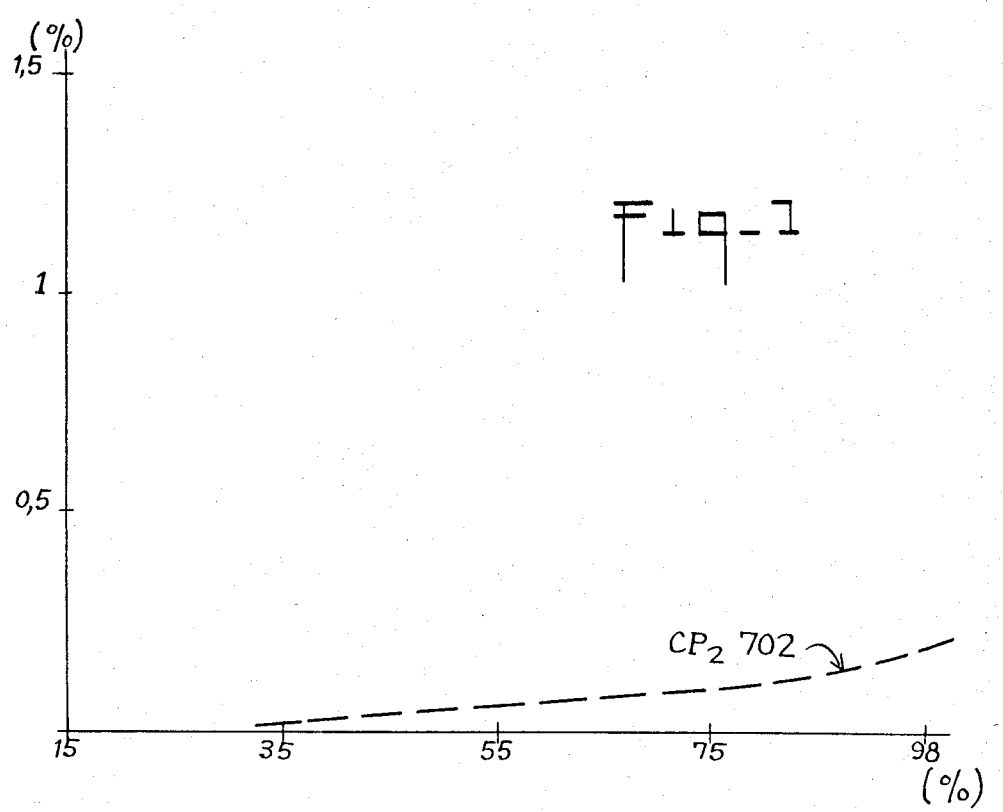
FIG. 1 shows the dimensional variation of the transparentized paper obtained according to the above example, as a function of the % of relative humidity, in the machine direction (M.D.)
Figure 2:
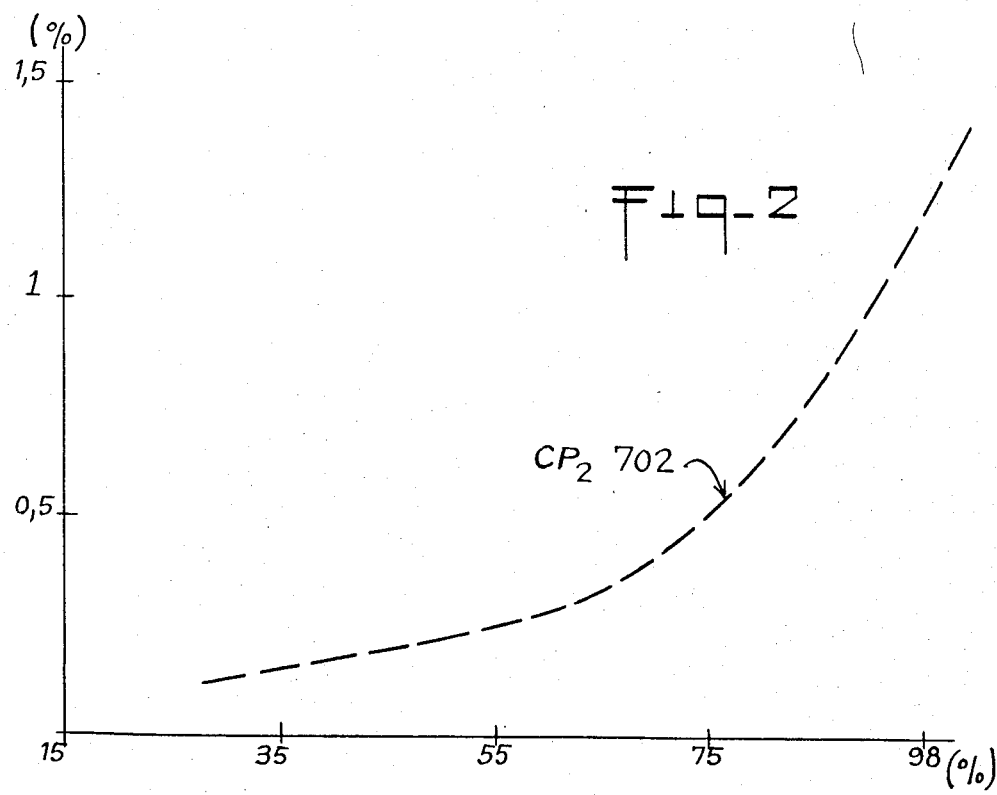
FIG. 2 shows the same variation of the same paper, but in the cross direction (C.D.) enables the characteristics of dimensional variation of the transparentized paper according to the invention to be appreciated.

No result was obtained by the offset process.

With a small laboratory photogravure machine comprising different engraving areas and a motif, the transparentized image of the different designs of the photogravure roller was obtained, the transparentization composition CP$_2$702 used as such acting as ink. It is therefore apt to produce watermarks by transparentization. In particular, no diffusion was noted in the cross direction, the letters of the design therefore being legible in the watermark.

TABLE I

| | BASIC PAPER | | TRACING PAPER |
| | BEFORE TRANS-PARENTIZATION | AFTER TRANS-PARENTIZATION | FOR COMPARISON |
|---|---|---|---|
| grammage (g/mhu 2) | 49 | 56 | 60 |
| thickness (μ) | 66 | 54 | 50 |
| density | 0.74 | 1.04 | 1.20 |
| tensile strength (kg) | | | |
| per 15 mm width | | | |
| machine direction | 6 | 5.9 | 9 |
| cross direction | 3.5 | 3.4 | 4.8 |
| tear (mN) | | | |

TABLE I-continued

| | BASIC PAPER | | TRACING PAPER |
| --- | --- | --- | --- |
| | BEFORE TRANS-PARENTIZATION | AFTER TRANS-PARENTIZATION | FOR COMPARISON |
| machine direction | 352 | 360 | 180 |
| cross direction | 424 | 390 | 270 |
| I 100 (tear index) | 765 | 670 | 375 |
| opacity (%) | 65 | 40.5 | 24–26 |
| Taber rigidity | | | |
| machine direction | 0.55 | 0.64 | |
| cross direction | 0.175 | 0.13 | |
| dimensional stability (% of variation between 15 and 98% of relative humidity) | | | |
| machine direction | | 0.25 | 0.3 |
| cross direction | | 1.20 | 3 |

TABLE II

| | TRACING PAPER | P 2 000 transparentized papers of American type | P 4 000 | $CP_2$ 702 (example according to the invention) |
| --- | --- | --- | --- | --- |
| grammage (g/m$^2$) | 60 | 64 | 68 | 56 |
| thickness (μ) | 50 | 71 | 83 | 54 |
| Bulk | 0.83 | 1.1 | 1.22 | 0.96 |
| Tensile strength (kg/15 mm) | | | | |
| machine direction | 9 | 5.97 | 6.26 | 5.91 |
| cross direction | 4.8 | 3.61 | 3.69 | 3.41 |
| Tear (mN) | | | | |
| machine direction | 180 | 420 | 540 | 360 |
| cross direction | 270 | 440 | 580 | 390 |
| Tear index (I 100) | 375 | 670 | 820 | 670 |
| Opacity (**) (%) | 24–26 | 50.5 | 47 | 40.5 |
| **Dimensional stability (*) (%)** | | | | |
| machine direction | 0.3 | 0.3 | 0.25 | 0.25 |
| cross direction | 3 | 0.80 | 0.80 | 1.2 |

I 100: tear (mN) relative to a paper with a grammage of 100
(*): variation between 15% and 98% of relative humidity
(**): as in the whole of the present Application, expressed in % accordance with standard NF Q - 03 - 006 ("measurement of the poacity of contrast of pulps and papers").
Bulk: ratio thickness (μ)/weight per m$^2$ (g).

What is claimed is:

1. A transparentized paper comprising a cellulosic support containing cellulosic materials impregnated with a transparentizing amount of a transparentizing composition containing a ketone-aldehyde transparentization resin; a thermal cross-linking aminoplast or modified or modified alkyd resin; a solvent system, a plasticizer and wherein at least part of the solvent system is retained in the transparentized paper after the aminoplast or modified alkyd resin has been heat cross-linked.

2. The paper of claim 1, wherein the support is selected from pure rags, chemical cellulose, 100% wood pulp and mixtures thereof.

3. The paper of claim 1, wherein the support has a grammage of between 20 and 350 g/m$^2$.

4. The paper of claim 2, wherein the support has a grammage of between 20 and 350 g/m$^2$.

5. The paper of claim 1 which is also contains a filler having a refractive index of about 1.5.

6. The paper of claim 3 which also contains a filler having a refractive index of about 1.5.

7. The paper of claim 1, wherein the transparentization composition contains, on a weight basis, from 10–20% of the ketone-aldehyde resin, from 15–30% of the aminoplast or modified alkyd resin, a solvent system comprising 10–20% of a petroleum cut with a boiling point >150° C. and a refractive index of between 1.4 and 1.6; from 7–15% of ethyl, butyl, isobutyl, isopropyl alcohol or mixtures thereof including mixtures of the alcohol and the petroleum cut; and from 25–35% of the plasticizer.

8. The paper of claim 1, wherein the transparentization composition contains, on a weight basis, from 10–20% of the ketone-aldehyde condensation resin, from 15–30% of the cross-linking resin which is hexamethoxymethylmelamine or a modifid alkyd resin; 7–15% isopropyl, butyl, isobutyl alcohol or mixtures thereof; 25–35% plasticizer; and from 10–20% of a solvent from the petroleum cut with a boiling point >150° C. and a refractive index of between 1.4 and 1.6.

9. The paper of claim 1, wherein the tranparentization composition contains, on a weight basis, 12% of a modified ketone-aldehyde condensation resin having an acid index of about 0.2 mg KOH/g and an OH index of from 300–320 mg KOH/g; 23% mexamethoxymethylmelamine resin; 4% ethyl alcohol, 17% butyl or isopropyl alcohol; 28% dibutylphthalate and 16% of the petroleum cut of isoparaffin.

10. The paper of claim 8 which also contains a filler.

11. The paper of claim 9 which also contains a filler.

12. The paper of claim 10 wherein the grammage of the support is between 20 and 350 g/m$^2$.

13. The paper of claim 11 wherein the grammage of the support is between 20 and 350 g/m$^2$.

* * * * *